United States Patent
Branson et al.

(10) Patent No.: US 10,769,277 B2
(45) Date of Patent: Sep. 8, 2020

(54) MALICIOUS APPLICATION DETECTION AND PREVENTION SYSTEM FOR STREAM COMPUTING APPLICATIONS DEPLOYED IN CLOUD COMPUTING ENVIRONMENTS

(71) Applicant: International Business Machines Corporation, Armonk, NY (US)

(72) Inventors: Michael J. Branson, Rochester, MN (US); David M. Koster, Reston, VA (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/012,349

(22) Filed: Jun. 19, 2018

(65) Prior Publication Data
US 2019/0384912 A1   Dec. 19, 2019

(51) Int. Cl.
*G06F 21/56* (2013.01)
*G06F 21/55* (2013.01)

(52) U.S. Cl.
CPC .......... *G06F 21/563* (2013.01); *G06F 21/554* (2013.01); *G06F 21/566* (2013.01)

(58) Field of Classification Search
CPC .................................................... G06F 21/563
USPC .......................................................... 726/24
See application file for complete search history.

(56) References Cited

U.S. PATENT DOCUMENTS

| | | | |
|---|---|---|---|
| 7,526,807 B2 | 4/2009 | Chao et al. | |
| 8,079,080 B2 * | 12/2011 | Borders | G06F 21/552 370/232 |
| 8,180,886 B2 * | 5/2012 | Overcash | H04L 63/1425 709/224 |
| 9,609,544 B2 * | 3/2017 | Raleigh | H04L 63/08 |
| 2002/0116635 A1 | 8/2002 | Sheymov | |

(Continued)

OTHER PUBLICATIONS

Baumgartner, L., et al., "Mastering Security Anomalies in Virtualized Computing Environments via Complex Event Processing", eKNOW 2012: The Fourth International Conference on Information, Process, and Knowledge Management, pp. 76-81.

(Continued)

*Primary Examiner* — Peter C Shaw
(74) *Attorney, Agent, or Firm* — Robert C. Bunker

(57) ABSTRACT

A method, system and computer program product for providing malicious application detection and prevention for stream computing applications deployed in cloud environments. Static and run-time analyses are performed of the stream computing application and any files associated therewith to create an expected profile of the stream computing application's behavior. The stream computing application is invoked in an execution environment to compare the stream computing application's behavior to the expected profile as the stream computing application runs in the execution environment. The stream computing application is isolated within the cloud computing environment when the stream computing application's behavior deviates significantly from the expected profile. The isolated stream computing application is investigated, wherein the output data that is stored is used for forensic investigation or replayed later if the stream computing application is not harmful.

17 Claims, 4 Drawing Sheets

(56) References Cited

U.S. PATENT DOCUMENTS

2004/0062199 A1\* 4/2004 Lau .......................... H04L 1/20
   370/230
2013/0219502 A1 8/2013 Danford et al.

OTHER PUBLICATIONS

Garfinkel, T., et al., "A Virtual Machine Introspection Based Architecture for Intrusion Detection", Proceedings of the 2003 Network and Distributed System Security Symposium, Jan. 2003, pp. 191-206.

Krishnan, P., et al., "Applying Security Assurance Techniques to a Mobile Phone Application: An Initial Approach", 2011 Fourth International Conference on Software Testing, Verification and Validation Workshops, pp. 545-552.

\* cited by examiner

US 10,769,277 B2

MALICIOUS APPLICATION DETECTION AND PREVENTION SYSTEM FOR STREAM COMPUTING APPLICATIONS DEPLOYED IN CLOUD COMPUTING ENVIRONMENTS

BACKGROUND

The present invention relates generally to a method and system for malicious application detection and prevention system for stream computing applications deployed in cloud computing environments.

A stream computing application ingests input data from one or more data sources, performs some form of processing of that data, e.g., aggregate, filter, detect patterns, etc., and then transmits the resulting output data to one or more data sinks. Preventing a stream computing application from performing Denial-of-Service (DoS) attacks or other attacks is hard to do, because the entire purpose of the stream computing application is to ingest data, process the data, and then sink the data. A malicious user could deploy a stream computing application for the sole purpose of attacking other services or sites on the Internet. The result could be blacklisting of the cloud provider's Internet Protocol (IP) address from other Internet sites, service availability impacts, etc.

Intrusion detection systems and malware detection can be used to detect and prevent malicious stream computing applications. Ample research exists in intrusion detection systems and malware detection. However, current solutions in screening applications are mostly manual or rule-based, and do not meet the needs of dynamic, on-demand applications deployed by customers.

Thus, there is a need in the art for a mechanism to allow legitimate cloud customers to write custom stream computing applications that ingest and sink data from and to unrestricted systems in multi-tenant environments, while preventing illegitimate users from deploying malicious applications.

SUMMARY

The invention provided herein has many embodiments useful, for example, in implementing a method, system and computer program product for malicious application detection and prevention system for stream computing applications deployed in cloud computing environments.

A stream computing application and a streaming application bundle (SAB) file are created, wherein the SAB file contains the stream computing application as well as any files associated therewith needed to run the stream computing application. Static and run-time analyses are performed of the stream computing application and the files associated therewith to create an expected profile of the stream computing application's behavior. The stream computing application is invoked in an execution environment to compare the stream computing application's behavior to the expected profile as the stream computing application runs in the execution environment. The stream computing application is isolated within the cloud computing environment when the stream computing application's behavior deviates significantly from the expected profile. The isolated stream computing application is investigated, wherein the output data that is stored is used for forensic investigation or replayed later if the stream computing application is not harmful.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention provides for malicious application detection and prevention system for stream computing applications deployed in cloud computing environments, which includes the following aspects:

- Container-based application profiling mechanisms for both static and run-time analysis of stream computing applications to locate and monitor connector operators (e.g., source and sink operators), as well as system calls
- Static analysis to compare the application to known bad patterns.
- Run-time analysis comparing an expected profile to actual run-time behavior.
- Isolation container to thwart attacks in cloud computing environments.
- Rapid batching of sink data to prevent attacks without losing customer data.
- Dynamic malware profile store for persisting bad-acting application patterns.

A core premise is the ability to prevent unrestricted stream computing applications submitted by customers to a cloud computing environment from doing harm to others, including the cloud computing environment itself, other cloud computing environments or services, other stream computing applications, or other sites on the Internet.

Cloud Computing Environment

Figure 1:
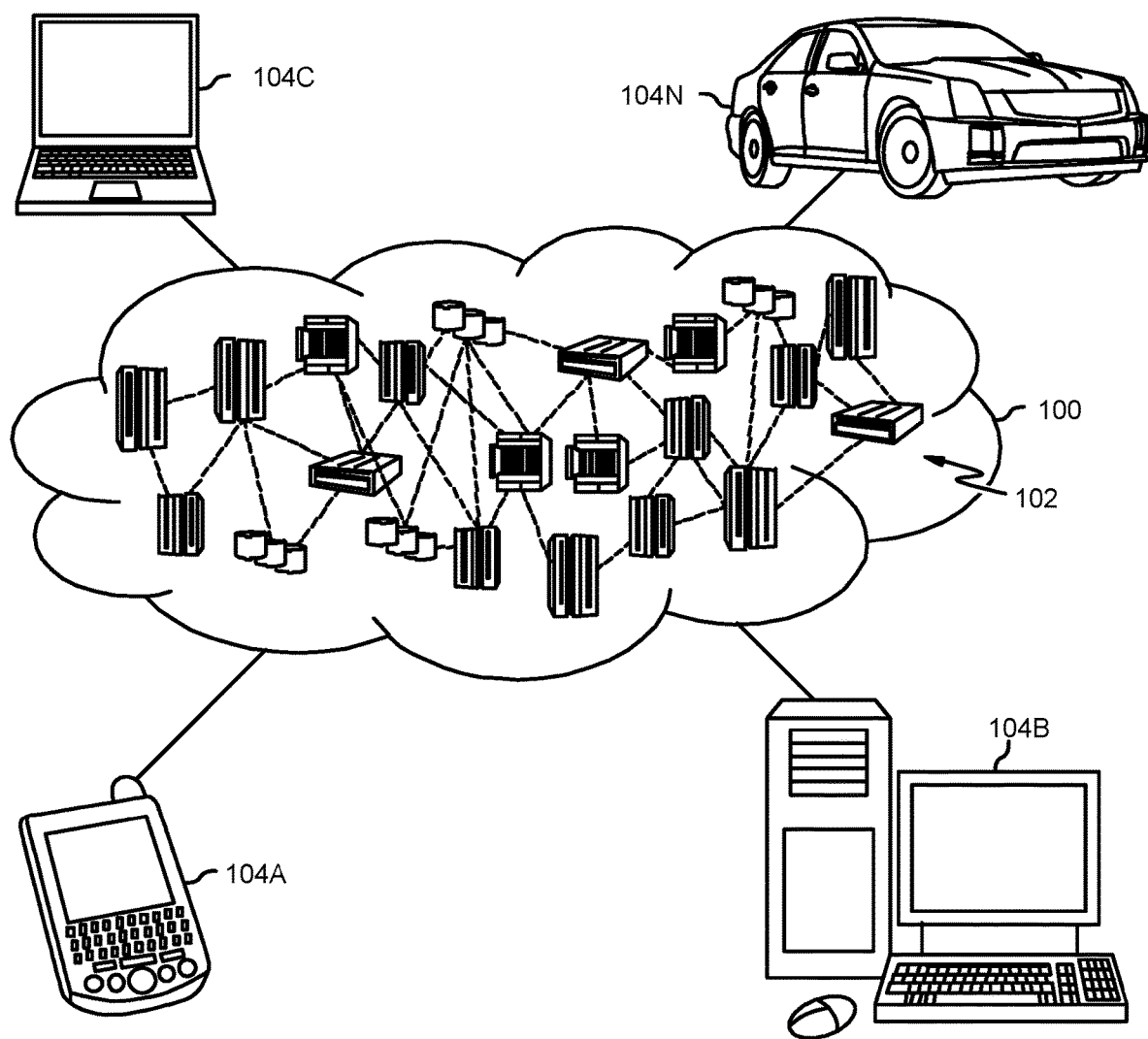
FIG. 1 is a pictorial representation of an illustrative cloud computing environment used for implementing a malicious application detection and prevention system for stream computing applications deployed in the cloud computing environment, according to one embodiment.

FIG. 1 is a pictorial representation of an illustrative cloud computing environment 100 used for implementing a malicious application detection and prevention system for stream computing applications deployed in the cloud computing environment 100, according to one embodiment.

As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below.

System Description

Figure 2:
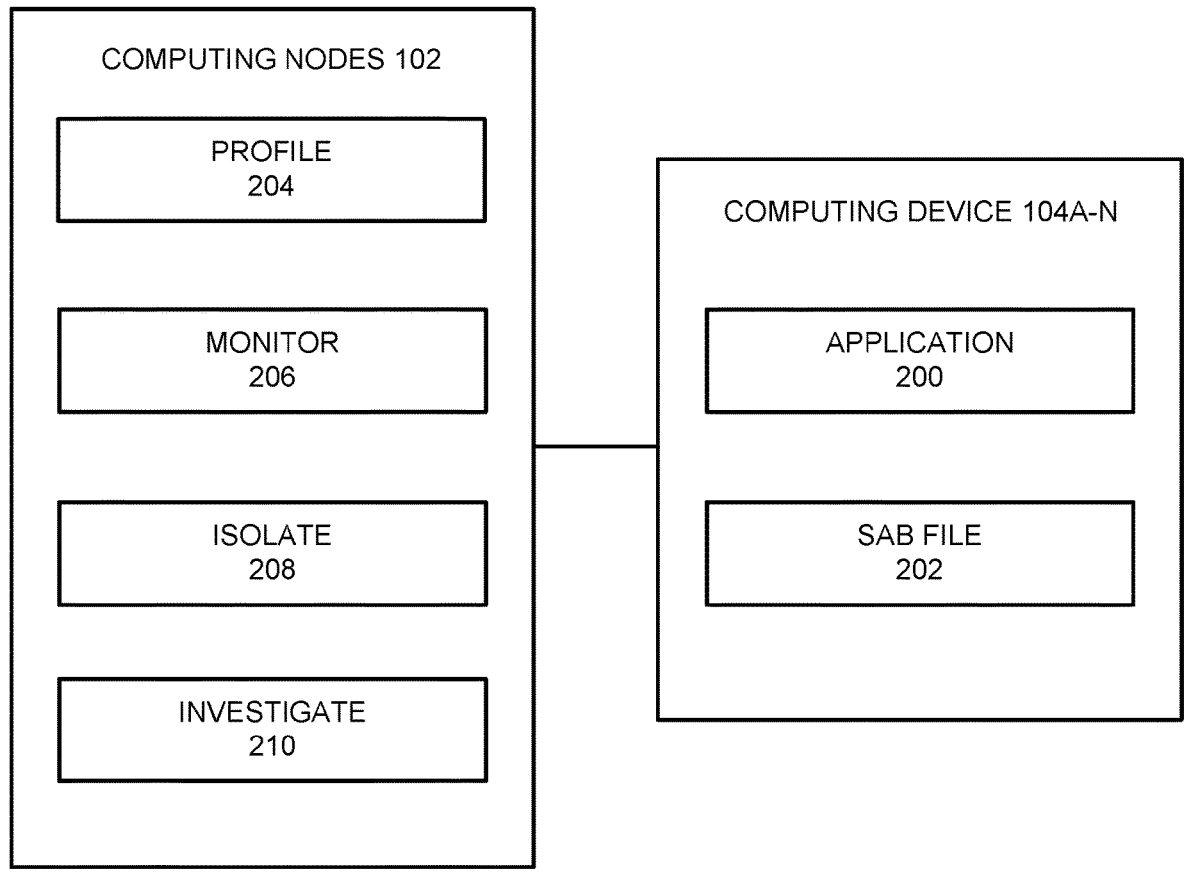
FIG. 2 is a block diagram illustrating how the system and method for malicious application detection and prevention system for stream computing applications deployed in cloud computing environments is implemented, according to one embodiment.

FIG. 2 is a block diagram illustrating how the system and method for malicious application detection and prevention system for stream computing applications deployed in cloud computing environments 100 is implemented, according to one embodiment. In this embodiment, the system and method are implemented by:

- the customer creates a stream computing application 200 and streaming application bundle (SAB) file 202 on the computing device 104A-N, wherein the SAB file contains the stream computing application 200 itself as well as any files needed to run the stream computing application 200; and
- the computing nodes 102 performs a plurality of steps or functions 204-210 that accept the stream computing application 200 and streaming application bundle (SAB) file 202 from the computing device 104A-N, and then perform the malicious application detection and prevention system.

There are a number of cloud computing environments 100 that provide stream computing services, e.g., IBM Streaming Analytics™, Amazon Kinesis™, Microsoft Azure Stream Analytics™, Google DataFlow™, etc. Customers submit a stream computing application 200 to the cloud computing environment 100 for execution, wherein the stream computing application 200 analyzes data in real-time and performs some type of analytics on the data. This is known as Platform as a Service (PaaS), which is a category of services in the cloud computing environment 100 that provides a platform allowing customers to develop, run, and manage stream computing applications 200 without the complexity of building and maintaining the infrastructure typically associated with developing and launching a stream computing application 200.

The problem with this PaaS environment is that customers may write malicious stream computing applications 200, submit them to the provider of the cloud computing environment 100 for execution, and then the provider becomes the attacker (or is attacked by the stream computing application 200). This is a real problem in today's cloud computing environments 100.

To address this problem, malware detection using signatures and static analysis has been performed by providers. However, one skilled in the art knows that signatures are easily avoided and static analysis is far from perfect. The present invention expands on these known approaches and provides a system that performs multiple layers of analysis and monitors streaming computing applications 200 for deviations from what is expected behavior.

Instead of performing a simple signature scan or a static analysis of a stream computing application 200 looking for what could be one of many potential dangerous code paths, the present invention uses an approach that leverages light-weight containers in a cloud computing environment 100 for isolation.

This approach performs the following steps or functions. The specifics of this description are based on the Streams™ and Streaming Analytics™ services provided by IBM Corporation, the assignee of the present invention. However, this invention also applies to other providers of cloud computing environments, although likely with a different terminology and flow.

In a Profile step or function 204, the customer uploads the SAB file 202 from the computing device 104A-N to the cloud computing environment 100. The computing nodes 102 provision a container for static and run-time analyses of the stream computing application 200 and SAB file 202.

The static analysis may include the following:

- extraction of the contents of the SAB file 202;
- decompilation of any executables for the stream computing application 200, such as Java™, Streams Processing Language (SPL)™, etc., found in the SAB file 202 and examination of the decompilation's results to identify known bad patterns (i.e., signatures) therein;
- analysis of any interpreted scripts or languages for the stream computing application 200, such as Perl™, Python™, Scala™, etc., found in the SAB file 202 to identify known bad patterns therein;
- analysis of any make files or other command files for the stream computing application 200, such as shell commands, etc., found in the SAB file 202 to identify known bad patterns therein;
- parsing of any data files or other remaining files for the stream computing application 200 found in the SAB file 202 to identify known bad patterns therein, for example, based on white listed characters; and
- rejection of the stream computing application 200, when the known bad patterns are identified in the static analysis.

The run-time analysis may include the following:

- analysis of any sources, sinks, and system calls in the stream computing application 200; and
- an estimated mapping of an amount of expected data to be sent from a source operator to a sink operator in the stream computing application 200. For example, if there is a one-to-one mapping of one tuple from the source operator to one tuple in the sink operator without any looping or multiple paths to enrich the data, it is expected that the sink output is the same as the source input.

In a Monitor step or function 206, after the stream computing application 200 is analyzed, the computing nodes 102 invoke the stream computing application 200 in an execution environment, which may be protected. As the stream computing application 200 runs in the execution environment, the computing nodes 102 compare the behavior of the stream computing application 200 to the expected profile. For example, it is known how many source operators, sink operators and system calls are in the stream computing application 200, as well as the estimated mapping of the amount of expected data to be sent from the source operators to the sink operators and the behavior of the stream computing application 200 should match the expected profile.

If the stream computing application 200 deviates from the expected profile, it is recognized that something has gone awry. For example, if the expected profile indicates that the stream computing application 200 has one source, performs some analytic operations, and outputs to one sink, it will be recognized that something is wrong if there is one source and several sinks.

In an Isolate step or function 208, if the behavior of the stream computing application 200 deviates significantly from the expected profile, the stream computing application 200 is moved to a newly provisioned and isolated container where it continues to receive data from its sources, but data is not sent to its sinks, and instead is stored.

In one embodiment, the behavior of the stream computing application 200 deviates significantly from the expected profile when it exceeds two standard deviations with regard to metrics found in the expected profile, for example, the number of source operators, sink operators or system calls, or the estimated mapping of the amount of expected data to be sent from the source operators to the sink operators.

The computing nodes 102 execute the stream computing application 200 in the newly provisioned and isolated container, where the stream computing application 200 is isolated from other tenants of the cloud computing environment 100 and the sink operations are cached and stored, but are not sent to their destination.

In an Investigate step or function 210, the stored data can be used for forensic investigation or replayed later if the stream computing application 200 is not harmful. The computing nodes 102 send a warning to the customer, as well as development, operations and/or security personnel of the cloud provider, stating that the stream computing application 200 is performing abnormally and is under investigation. The development, operations and/or security personnel of the cloud provider then perform a forensic investigation of the stream computing application 200, which may include, if the stream computing application 200 is malicious, identifying now known bad patterns therein, and updating the static analysis accordingly.

Flowchart

Figure 3:
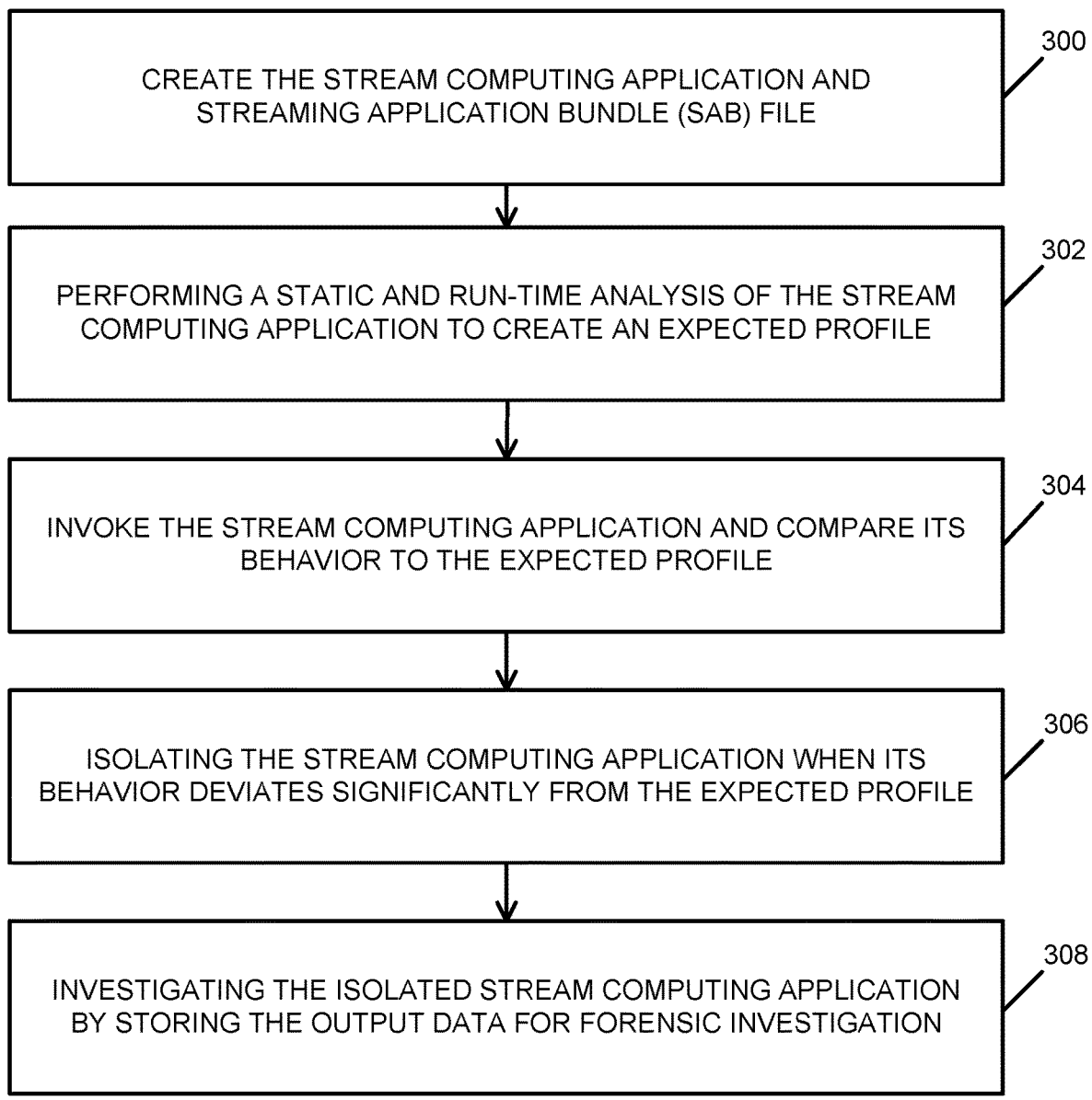
FIG. 3 is a flowchart illustrating the steps and functions performed by the system when implementing the computer-implemented method of this invention, according to one embodiment.

FIG. 3 is a flowchart illustrating the steps and functions performed by the cloud computing environment 100 when implementing the computer-implemented method of this invention, according to one embodiment. Specifically, these steps and functions illustrate how the cloud computing environment 100 is used for malicious application detection and prevention system for stream computing applications 200 deployed in cloud computing environments 100.

Block 300 represents the computing device 104A-N creating the stream computing application 200 and the streaming application bundle (SAB) file 202 and then uploading the SAB file 202 to the computing nodes 102, wherein the SAB file 202 contains the stream computing application 200 as well as any files associated therewith needed to run the stream computing application 200.

Block 302 represents the computing nodes 102 performing static and run-time analyses of the stream computing application 200 and the files associated therewith.

The static analysis may include: extracting the SAB file's 202 contents; decompiling any executables in the SAB file's 202 contents and examination of the decompiling's results to identify known bad patterns therein; analyzing any interpreted scripts or languages in the SAB file's 202 contents to identify known bad patterns therein; analyzing any make or command files in the SAB file's 202 contents to identify known bad patterns therein; analyzing any data files or other files in the SAB file's 202 contents to identify known bad patterns therein; and rejecting the stream computing application 200 when the known bad patterns are identified in the static analysis.

The run-time analysis may include: analyzing any sources, sinks, and system calls in the stream computing application 200; and performing an estimated mapping of an amount of expected data to be sent from one or more source operators to one or more sink operators in the stream computing application 200.

Block 304 represents the computing nodes 102 invoking the stream computing application 200 in an execution environment to compare the stream computing application's 200 behavior to the expected profile as the stream computing application 200 runs in the execution environment.

Block 306 represents the computing nodes 102 isolating the stream computing application 200 within the cloud computing environment 100 when the stream computing application's 200 behavior deviates significantly from the expected profile. The behavior of the stream computing application 200 deviates significantly from the expected profile when it exceeds two standard deviations with regard to metrics found in the expected profile. Isolating the stream computing application 200 may comprise moving the stream computing application 200 to an isolated container where it continues to receive input data from its sources, but output data is not sent to its sinks, and instead the output data is stored.

Block 308 represents the computing nodes 102 investigating the isolated stream computing application 200, wherein the output data that is stored is used for forensic investigation or replayed later if the stream computing application 200 is not harmful. In addition, the computing nodes 102 may send a warning to one or more entities that the stream computing application 200 is performing abnormally and is under investigation.

Statutory Subject Matter

It can be seen that the present invention provides a number of benefits and advantages. These benefits and advantages include improvements to the technology or technical field of application management, and more specifically, providing for malicious application detection and prevention system for stream computing applications 200 deployed in cloud computing environments 100. These benefits and advantages also include improvements to the functioning of the devices themselves, including the cloud computing environment 100 generally and the computing nodes 102 specifically, as well as the computing devices 104A-N, as compared to prior computer-implemented methods and systems providing malicious application detection and prevention.

With regard to improvements to the technology or technical field of application management, the computer-implemented method and system performs static and run-time analyses of the stream computing application 200 and any files associated therewith to create an expected profile of the stream computing application's 200 behavior. The stream computing application 200 is invoked in an execution environment to compare the stream computing application's 200 behavior to the expected profile. The stream computing application 200 is isolated within the cloud computing environment 100 when the stream computing application's 200 behavior deviates significantly from the expected profile. The isolated stream computing application 200 is investigated, wherein the output data that is stored is used for forensic investigation or replayed later if the stream computing application 200 is not harmful.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

The result is improved performance, accuracy and security with regards to computing nodes 102, as well as computing devices 104A-N. Customers and providers are able to rely on the computing nodes 102 more quickly, accurately and securely performing malicious application detection and prevention of stream computing applications 200 deployed in cloud computing environments 100.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 4:
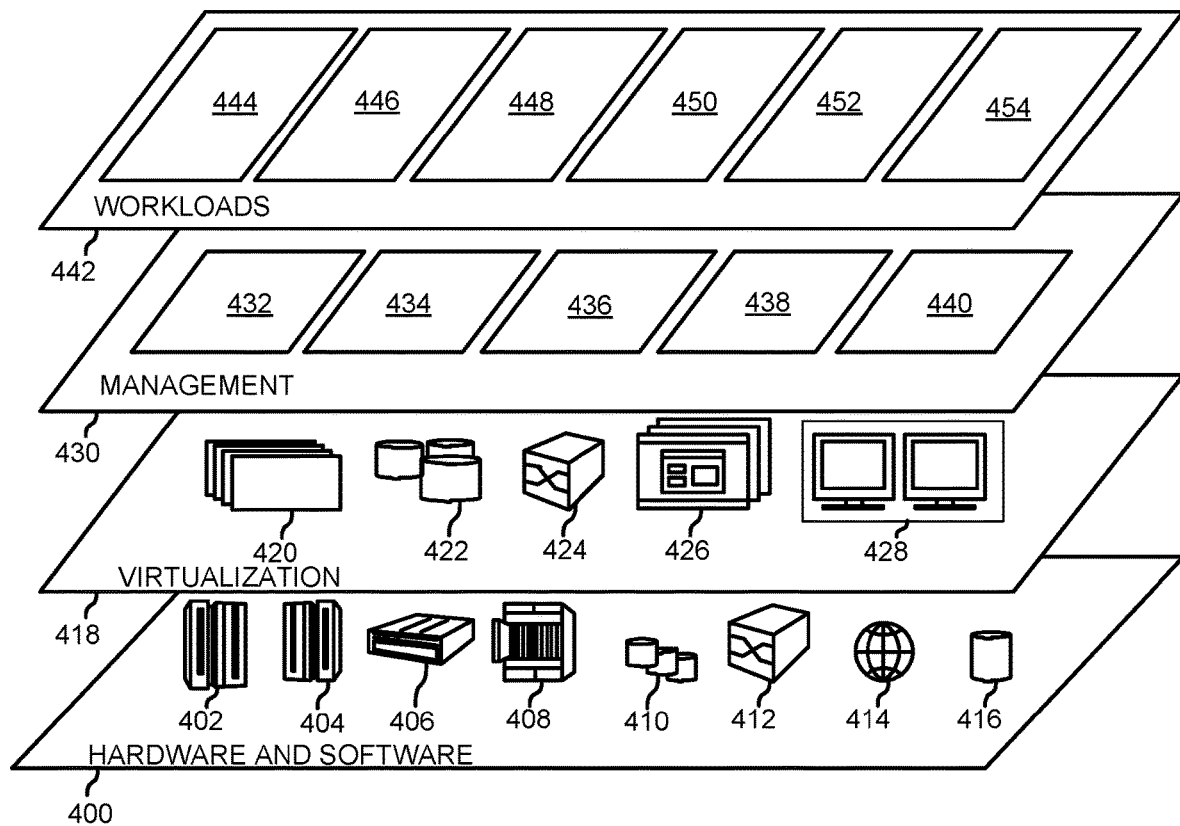
FIG. 4 illustrates a set of functional abstraction layers provided by the cloud computing environment.

Referring now to FIG. 4, a set of functional abstraction layers provided by cloud computing environment 100 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402, a RISC (Reduced Instruction Set Computer) architecture based servers 404, servers 406, and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 100. Metering and pricing 434 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 436 provides access to the cloud computing environment 100 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 100 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions for providing a malicious application detection and prevention system for stream computing applications deployed in cloud computing environments 454 as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising: providing malicious application detection and prevention for a stream computing application deployed in a cloud computing environment, by: performing static and run-time analyses of the stream computing application and any files associated therewith to create an expected profile of the stream computing application's behaviour, wherein the run-time analysis includes: analyzing any sources, sinks or system calls in the stream computing application, performing an estimated mapping of an amount of expected data to be sent from one or more source operators to one or more sink operators in the stream computing application and monitoring the sent data for deviation from the expected value data; invoking the stream computing application in an execution environment to compare the stream computing application's behavior to the expected profile as the stream computing application runs in the execution environment; and isolating the stream computing application within the cloud computing environment when the stream computing application's behavior deviates significantly from the expected profile.

2. The method of claim 1, further comprising creating the stream computing application and a streaming application bundle (SAB) file, wherein the SAB file contains the stream computing application as well as the files associated therewith.

3. The method of claim 2, wherein the static analysis includes: extracting the SAB file's contents; decompiling any executables in the SAB file's contents to identify known bad patterns therein; analyzing any interpreted scripts or languages in the SAB file's contents to identify the known bad patterns therein; analyzing any make or command files in the SAB file's contents to identify the known bad patterns therein; analyzing any data files or other files in the SAB file's contents to identify the known bad patterns therein; and rejecting the stream computing application when the known bad patterns are identified in the static analysis.

4. The method of claim 1, wherein the stream computing application's behavior deviates significantly from the expected profile when it exceeds two standard deviations with regard to metrics found in the expected profile.

5. The method of claim 1, wherein isolating the stream computing application comprises moving the stream computing application to an isolated container where it continues to receive data from its source operators, but the data is not sent to its sink operators, and instead the data is stored.

6. The method of claim 5, further comprising investigating the isolated stream computing application, wherein the data that is stored is used for forensic investigation or replayed later if the stream computing application is not harmful.

7. The method of claim 6, wherein investigating the isolated stream computing application comprises sending a warning to one or more entities that the stream computing application is performing abnormally and is under investigation.

8. A computer-implemented system, comprising: one or more computers programmed for providing malicious application detection and prevention for a stream computing application deployed in a cloud computing environment, by: performing static and run-time analyses of the stream computing application and any files associated therewith to create an expected profile of the stream computing application's behavior, wherein the run-time analysis includes: analyzing any sources, sinks or system calls in the stream computing application, performing an estimated mapping of an amount of expected data to be sent from one or more source operators to one or more sink operators in the stream computing application and monitoring the sent data for deviation from the expected value data; invoking the stream computing application in an execution environment to compare the stream computing application's behavior to the expected profile as the stream computing application runs in the execution environment; and isolating the stream computing application within the cloud computing environment when the stream computing application's behavior deviates significantly from the expected profile.

9. The system of claim 8, further comprising creating the stream computing application and a streaming application bundle (SAB) file, wherein the SAB file contains the stream computing application as well as the files associated therewith.

10. The system of claim 9, wherein the static analysis includes: extracting the SAB file's contents; decompiling any executables in the SAB file's contents to identify known bad patterns therein; analyzing any interpreted scripts or languages in the SAB file's contents to identify the known bad patterns therein; analyzing any make or command files in the SAB file's contents to identify the known bad patterns therein; analyzing any data files or other files in the SAB file's contents to identify the known bad patterns therein; and rejecting the stream computing application when the known bad patterns are identified in the static analysis.

11. The system of claim 8, wherein the stream computing application's behavior deviates significantly from the expected profile when it exceeds two standard deviations with regard to metrics found in the expected profile.

12. The system of claim 8, wherein isolating the stream computing application comprises moving the stream computing application to an isolated container where it continues to receive data from its source operators, but the data is not sent to its sink operators, and instead the data is stored.

13. The system of claim 12, further comprising investigating the isolated stream computing application, wherein the data that is stored is used for forensic investigation or replayed later if the stream computing application is not harmful.

14. The system of claim 13, wherein investigating the isolated stream computing application comprises sending a warning to one or more entities that the stream computing application is performing abnormally and is under investigation.

15. A computer program product, the computer program product comprising a computer readable storage medium having program instructions embodied therewith, the program instructions executable by one or more computers to cause the computers to perform a method, comprising: providing malicious application detection and prevention for a stream computing application deployed in a cloud computing environment, by: performing static and run-time analyses of the stream computing application and any files associated therewith to create an expected profile of the stream computing application's behavior, wherein the run-time analysis includes: analyzing any sources, sinks or system calls in the stream computing application, performing an estimated mapping of an amount of expected data to be sent from one or more source operators to one or more sink operators in the stream computing application and monitoring the sent data for deviation from the expected value data; invoking the stream computing application in an execution environment to compare the stream computing application's behavior to the expected profile as the stream computing application runs in the execution environment; and isolating the stream computing application within the cloud computing environment when the stream computing application's behavior deviates significantly from the expected profile.

16. The computer program product of claim 15, wherein the static analysis includes: extracting the SAB file's contents; decompiling any executables in the SAB file's contents to identify known bad patterns therein; analyzing any interpreted scripts or languages in the SAB file's contents to identify the known bad patterns therein; analyzing any make or command files in the SAB file's contents to identify the known bad patterns therein; analyzing any data files or other files in the SAB file's contents to identify the known bad patterns therein; and rejecting the stream computing application when the known bad patterns are identified in the static analysis.

17. The computer program product of claim 15, wherein isolating the stream computing application comprises moving the stream computing application to an isolated container where it continues to receive data from its source operators, but the data is not sent to its sink operators, and instead the data is stored, and wherein the data that is stored is used for forensic investigation or replayed later if the stream computing application is not harmful.

* * * * *